United States Patent
Fan et al.

(10) Patent No.: US 9,973,351 B2
(45) Date of Patent: May 15, 2018

(54) DATA PROCESSING METHOD AND APPARATUS, STORAGE CONTROLLER, AND CABINET

(71) Applicant: Huawei Technologies Co., Ltd., Shenzhen (CN)

(72) Inventors: Bin Fan, Shenzhen (CN); Yu Zhang, Shenzhen (CN); Haitao Guo, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/173,494

(22) Filed: Jun. 3, 2016

(65) Prior Publication Data

US 2016/0285648 A1 Sep. 29, 2016

Related U.S. Application Data

(63) Continuation of application No. PCT/CN2013/088520, filed on Dec. 4, 2013.

(51) Int. Cl.
*H04L 12/64* (2006.01)
*H04H 20/26* (2008.01)
(Continued)

(52) U.S. Cl.
CPC ......... *H04L 12/6418* (2013.01); *H04H 20/26* (2013.01); *H04L 45/745* (2013.01);
(Continued)

(58) Field of Classification Search
CPC ... H04L 12/64; H04L 12/741; H04L 12/6418; H04L 29/06; H04L 29/08; H04L 29/12;
(Continued)

(56) References Cited

U.S. PATENT DOCUMENTS

2003/0130833 A1\* 7/2003 Brownell .......... H04L 29/12009
703/23
2006/0123111 A1 6/2006 Dea et al.
(Continued)

FOREIGN PATENT DOCUMENTS

CN 2790047 Y 6/2006
CN 101178634 A 5/2008
(Continued)

OTHER PUBLICATIONS

Hopkins et al., "AoE (ATA over Ethernet)," AoEr11, XP55296002A, pp. 1-12, The Brantley Coile Company Inc., Athens, GA (Feb. 2009).
(Continued)

*Primary Examiner* — Ian N Moore
*Assistant Examiner* — Mewale Ambaye
(74) *Attorney, Agent, or Firm* — Leydig, Voit & Mayer, Ltd.

(57) ABSTRACT

Embodiments of the present invention provide a data processing method, where, after being encapsulated according to an Ethernet protocol, a data processing command is sent to a cabinet by using an Ethernet switch, so that a storage controller in a storage engine can communicate with the cabinet by using the Ethernet switch, thereby effectively utilizing advantages such as ease of expansion and simple operation of the Ethernet switch.

8 Claims, 10 Drawing Sheets

(51) Int. Cl.
  *H04L 12/741* (2013.01)
  *H04L 29/12* (2006.01)
  *H04L 29/08* (2006.01)
  *H04L 29/06* (2006.01)

(52) U.S. Cl.
  CPC ...... *H04L 61/6022* (2013.01); *H04L 67/1034* (2013.01); *H04L 67/1097* (2013.01); *H04L 69/22* (2013.01)

(58) Field of Classification Search
  CPC ... H04L 45/745; H04L 61/6022; H04L 69/22; H04H 20/26
  See application file for complete search history.

(56) References Cited

U.S. PATENT DOCUMENTS

| | | | |
|---|---|---|---|
| 2010/0198972 A1* | 8/2010 | Umbehocker | G06F 3/0604 709/226 |
| 2011/0296230 A1 | 12/2011 | Chen et al. | |

FOREIGN PATENT DOCUMENTS

| | | | |
|---|---|---|---|
| CN | 101192991 | A | 6/2008 |
| CN | 101296186 | * | 10/2008 |
| CN | 101296186 | A | 10/2008 |
| CN | 102263807 | A | 11/2011 |
| CN | 102292699 | A | 12/2011 |
| CN | 102799708 | A | 11/2012 |
| CN | 103049225 | A | 4/2013 |

OTHER PUBLICATIONS

Kumar, "How to Build a Low Cost SAN," XP55318118, pp. 1-23, (Apr. 9, 2009).
Rodo, "Export your block devices with AoE," Debian, XP55390695A, pp. 1-6, (Oct. 11, 2007).
Quanstrom, "aoecfg(8)—Linux man page," XP55390970a, pp. 1-2, (Retrieved from the Internet: Jul. 14, 2017).
"ATA over Ethernet," Wikipedia, Retrieved from https://en.wikipedia.org/w/index.php?title=ATA_over_Ethernet&oldid=583755362 (Nov. 29, 2013).
Kumar, "How to Build a Low Cost SAN—p. 3," https://www.howtoforge.com/how-to-build-a-low-cost-san-p3 (Apr. 9, 2009).

* cited by examiner

| MAC header | | | payload | | | |
|---|---|---|---|---|---|---|
| Destination MAC address | Source MAC address | Protocol type | Request type | Interface address of a storage apparatus A | Interface address of a storage apparatus B | ... |

FIG. 6

DATA PROCESSING METHOD AND APPARATUS, STORAGE CONTROLLER, AND CABINET

CROSS-REFERENCE TO RELATED APPLICATIONS

This application is a continuation of International Patent Application No. PCT/CN2013/088520, filed on Dec. 4, 2013, which is hereby incorporated by reference in its entirety.

TECHNICAL FIELD

Embodiments of the present invention relate to storage technologies, and in particular, to a data processing method and apparatus, a storage controller, and a cabinet.

BACKGROUND

In a current storage network, for example, a storage area network (SAN), as shown in FIG. 1, a server and a storage engine are connected to a switch separately, an end of the storage engine that is connected to the switch is a front end, and a back end of the storage engine is connected to a cabinet. To avoid a single point of failure, two controllers, for example, a controller A and a controller B shown in FIG. 1, are disposed in the storage engine. When a controller A in a storage engine A becomes faulty, the server accesses a disk in the cabinet by using a storage controller B in the storage engine A. However, if both the storage controllers A and B in the storage engine A become faulty, data in a cabinet A connected to the storage engine A cannot be accessed. As a result, reliability of the storage area network is restricted.

In the prior art, a back end of a storage engine is connected to a switch that has a serial attached SCSI (SAS) interface, so that storage controllers are connected by using a cabinet of a SAS switch, and a target cabinet can be accessed by using any storage controller.

However, it is found that a quantity of interfaces of a switch that are used to connect a storage engine and a cabinet is excessively small, for example, a SAS switch has only 16 interfaces, so that a quantity of connected controllers and cabinets is limited; and a length of a cable of the switch is limited, and large-scale expansion cannot be performed, so that a total quantity of capacities of disks that can be connected is limited.

SUMMARY

Embodiments of the present invention provide a data processing method and apparatus, a storage controller, and a cabinet, so that a storage controller in a storage engine can communicate with a cabinet by using an Ethernet switch.

According to a first aspect, an embodiment of the present invention provides a data processing method, applied to a storage network, where the storage network includes a storage controller, an Ethernet switch, and a cabinet, where an operating system runs in the storage controller, the storage controller and the cabinet are connected to the Ethernet switch separately, the storage controller communicates with the cabinet by using the Ethernet switch, multiple storage apparatuses are disposed in the cabinet, and the cabinet manages the storage apparatuses disposed therein; and the method includes:

receiving, by the storage controller, a data processing command sent by the operating system, where the command includes an identifier of a target storage apparatus aimed at by the data processing command;

searching, by the storage controller, a preset mapping relationship for a media access control (MAC) address of a target cabinet corresponding to the identifier included in the data processing command and for an interface address of the target storage apparatus; and constructing, by the storage controller, an Ethernet packet, where the Ethernet packet includes the MAC address of the target cabinet, and the data processing command and the found interface address of the target storage apparatus that are encapsulated according to an Ethernet protocol, and sending the Ethernet packet to the target cabinet by using the Ethernet switch.

With reference to the first aspect, this embodiment of the present invention provides a first possible implementation manner of the first aspect, where before the receiving, by the storage controller, a data processing command sent by the operating system, the method further includes:

encapsulating, by the storage controller, a broadcast packet in an Ethernet broadcast packet according to the Ethernet protocol, and sending, to the cabinet in the storage network by using the Ethernet switch, the Ethernet broadcast packet in which the request command is encapsulated, where the request command is used to request the cabinet to report a MAC address of the local cabinet and information about the managed storage apparatuses;

receiving, by the storage controller, a response message fed back by using the Ethernet switch by the cabinet in the storage network, where the response message includes the MAC address of the cabinet and interface addresses, encapsulated according to the Ethernet protocol, of the managed storage apparatuses; and allocating, by the storage controller, identifiers to the storage apparatuses corresponding to the interface addresses of the storage apparatuses in the response message, and establishing a mapping relationship among an interface address of a storage apparatus in the storage network, an identifier of the storage apparatus, and a MAC address of a cabinet to which the storage apparatus belongs, where the identifier of the storage apparatus is an identifier that can be identified by the operating system.

With reference to the first possible implementation manner of the first aspect, this embodiment of the present invention provides a second possible implementation manner, where after the allocating, by the storage controller, identifiers to the storage apparatuses corresponding to the interface addresses of the storage apparatuses in the response message, the method further includes:

registering, by the storage controller, the identifiers allocated to the storage apparatuses to a kernel of the operating system running in the storage controller.

According to a second aspect, an embodiment of the present invention provides a data processing method, applied to a storage network, where the storage network includes a storage controller, an Ethernet switch, and a cabinet, where an operating system runs in the storage controller, the storage controller and the cabinet are connected to the Ethernet switch separately, the storage controller communicates with the cabinet by using the Ethernet switch, multiple storage apparatuses are disposed in the cabinet, and the cabinet manages the storage apparatuses disposed therein; and the method includes:

receiving, by the cabinet, an Ethernet packet that is from the storage controller and that is forwarded by the Ethernet switch, where the Ethernet packet includes a data processing command and an interface address of a target storage apparatus aimed at by the data processing command that are encapsulated according to an Ethernet protocol;

parsing, by the cabinet, the received Ethernet packet according to the Ethernet protocol to obtain the data processing command and the interface address of the target storage apparatus aimed at by the data processing command that are encapsulated in the received Ethernet packet; and sending, by the cabinet, the data processing command to the target storage apparatus according to the interface address of the target storage apparatus.

With reference to the second aspect, this embodiment of the present invention provides a first possible implementation manner of the second aspect, where before the receiving, by the cabinet, an Ethernet packet that is from the storage controller and that is forwarded by the Ethernet switch, the method further includes:

receiving, by the cabinet, an Ethernet broadcast packet sent by using the Ethernet switch by the storage controller, where the Ethernet broadcast packet includes a request command encapsulated according to the Ethernet protocol, and the request command is used to request the cabinet to report a MAC address of the local cabinet and information about the managed storage apparatuses; and feeding back, by the cabinet by using the Ethernet switch, a response message to the Ethernet broadcast packet storage controller, where the response message includes the MAC address of the local cabinet and interface addresses, encapsulated according to the Ethernet protocol, of the storage apparatuses managed by the local cabinet.

According to a third aspect, an embodiment of the present invention provides a storage controller, applied to a storage network, where the storage network includes the storage controller, an Ethernet switch, and a cabinet, where an operating system runs in the storage controller, the storage controller and the cabinet are connected to the Ethernet switch separately, the storage controller communicates with the cabinet by using the Ethernet switch, multiple storage apparatuses are disposed in the cabinet, the cabinet manages the storage apparatuses disposed therein, and the storage controller includes a memory, a processor, an Ethernet card, and a communications bus, where the memory, the processor, and the Ethernet card communicate with each other by using the bus, and the processor receives an Ethernet packet by using the Ethernet card;

the memory is configured to store a computer program instruction;

the processor is configured to execute the following according to the computer program instruction: receiving a data processing command sent by the operating system, where the command includes an identifier of a target storage apparatus aimed at by the data processing command; searching a preset mapping relationship for a media access control (MAC) address of a target cabinet corresponding to the identifier included in the data processing command and for an interface address of the target storage apparatus; constructing an Ethernet packet, where the Ethernet packet includes the MAC address of the target cabinet, and the data processing command and the found interface address of the target storage apparatus that are encapsulated according to an Ethernet protocol; and sending the Ethernet packet to the Ethernet card; and the Ethernet card is configured to send the Ethernet packet to the target cabinet by using the Ethernet switch.

With reference to the third aspect, this embodiment of the present invention provides a first possible implementation manner of the third aspect, where before executing the step of receiving a data processing command sent by the operating system, the processor is further configured to: encapsulate a request command in an Ethernet broadcast packet according to the Ethernet protocol; and send, to the Ethernet card, the Ethernet broadcast packet in which the request command is encapsulated, where the request command is used to request the cabinet to report a MAC address of the local cabinet and information about the managed storage apparatuses;

the Ethernet card is further configured to: send the Ethernet broadcast packet to the cabinet in the storage network by using the Ethernet switch; and receive a response message fed back by using the Ethernet switch by the cabinet in the storage network, where the response message includes the MAC address of the cabinet and interface addresses, encapsulated according to the Ethernet protocol, of the managed storage apparatuses; and the processor is further configured to: allocate identifiers to the storage apparatuses corresponding to the interface addresses of the storage apparatuses in the response message, and establish a mapping relationship among an interface address of a storage apparatus in the storage network, an identifier of the storage apparatus, and a MAC address of a cabinet to which the storage apparatus belongs, where the identifier of the storage apparatus is an identifier that can be identified by the operating system.

With reference to the first possible implementation manner of the third aspect, this embodiment of the present invention further provides a second possible implementation manner, where the processor is further configured to: after allocating the identifiers to the storage apparatuses, register the identifiers allocated to the storage apparatuses to a kernel of the operating system running in the storage controller.

According to a fourth aspect, an embodiment of the present invention provides a cabinet, applied to a storage network, where the storage network includes a storage controller, an Ethernet switch, and the cabinet, where an operating system runs in the storage controller, the storage controller and the cabinet are connected to the Ethernet switch separately, the storage controller communicates with the cabinet by using the Ethernet switch, multiple storage apparatuses are disposed in the cabinet, the cabinet manages the storage apparatuses disposed therein, and the cabinet includes a memory, a processor, an Ethernet card, and a communications bus, where the memory, the processor, and the Ethernet card communicate with each other by using the bus, and the processor receives an Ethernet packet by using the Ethernet card;

the Ethernet card is configured to receive an Ethernet packet that is from the storage controller and that is forwarded by the Ethernet switch, where the Ethernet packet includes a data processing command and an interface address of a target storage apparatus aimed at by the data processing command that are encapsulated according to an Ethernet protocol;

the memory is configured to store a computer program instruction; and the processor is configured to: parse the received Ethernet packet according to the Ethernet protocol to obtain the data processing command and the interface address of the target storage apparatus aimed at by the data processing command that are encapsulated in the received Ethernet packet; and send the data processing command to the target storage apparatus according to the interface address of the target storage apparatus.

With reference to the fourth aspect, this embodiment of the present invention provides a first possible implementation manner of the fourth aspect, where the Ethernet card is further configured to receive an Ethernet broadcast packet sent by using the Ethernet switch by the storage controller, where the Ethernet broadcast packet includes a request command encapsulated according to the Ethernet protocol, and the request command is used to request the cabinet to report a MAC address of the local cabinet and information about the managed storage apparatuses;

the processor is further configured to: parse the Ethernet broadcast packet; and send a response message to the Ethernet card according to the request command, where the response message includes the MAC address of the local cabinet and interface addresses, encapsulated according to the Ethernet protocol, of the storage apparatuses managed by the local cabinet; and the Ethernet card is further configured to receive the response message, and feed back the response message to the storage controller by using the Ethernet switch.

According to a fifth aspect, an embodiment of the present invention provides a data processing apparatus, where an operating system runs in the data processing apparatus, and the data processing apparatus includes:

a command receiving unit, configured to receive a data processing command sent by the operating system, where the command includes an identifier of a target storage apparatus aimed at by the data processing command;

a search unit, configured to search a preset mapping relationship for a MAC address of a target cabinet corresponding to the identifier included in the data processing command and for an interface address of the target storage apparatus, where the target cabinet manages the target storage apparatus;

an encapsulation unit, configured to construct an Ethernet packet, where the Ethernet packet includes the MAC address of the target cabinet, and the data processing command and the found interface address of the target storage apparatus that are encapsulated according to an Ethernet protocol; and an interface unit, configured to send the Ethernet packet to the target cabinet by using an Ethernet switch.

With reference to the fifth aspect, this embodiment of the present invention provides a first possible implementation manner of the fifth aspect, where before the command receiving unit receives the data processing command sent by the operating system, the encapsulation unit is further configured to encapsulate a request command in an Ethernet broadcast packet according to the Ethernet protocol, where the request command is used to request a cabinet to report a MAC address of the local cabinet and information about a managed storage apparatus;

the interface unit is further configured to: send, to the cabinet in the storage network by using the Ethernet switch, the Ethernet broadcast packet in which the request command is encapsulated; and receive a response message fed back by using the Ethernet switch by the cabinet in the storage network, where the response message includes the MAC address of the cabinet and an interface address, encapsulated according to the Ethernet protocol, of the managed storage apparatus; and the data processing apparatus further includes: an identifier allocation unit, configured to: allocate an identifier to the storage apparatus corresponding to the interface address of the storage apparatus in the response message, and establish a mapping relationship among an interface address of a storage apparatus in the storage network, an identifier of the storage apparatus, and a MAC address of a cabinet to which the storage apparatus belongs, where the identifier of the storage apparatus is an identifier that can be identified by the operating system.

According to a sixth aspect, an embodiment of the present invention provides a data processing apparatus, where multiple storage apparatuses are disposed in the data processing apparatus, the data processing apparatus manages the storage apparatuses disposed therein, and the data processing apparatus includes:

an interface unit, configured to receive an Ethernet packet, where the Ethernet packet includes a data processing command and an interface address of a target storage apparatus aimed at by the data processing command that are encapsulated according to an Ethernet protocol;

a parsing unit, configured to parse the received Ethernet packet according to the Ethernet protocol to obtain the data processing command and the interface address of the target storage apparatus aimed at by the data processing command that are encapsulated in the received Ethernet packet according to the Ethernet protocol; and a sending unit, configured to: send the data processing command to the target storage apparatus according to the interface address of the target storage apparatus.

With reference to the sixth aspect, this embodiment of the present invention provides a first possible implementation manner, where the interface unit is further configured to receive an Ethernet broadcast packet sent by using an Ethernet switch, where the Ethernet broadcast packet includes a request command encapsulated according to the Ethernet protocol, and the request command is used to request the data processing apparatus to report a MAC address of the local data processing apparatus and information about the managed storage apparatuses;

the parsing unit is further configured to: parse the Ethernet broadcast packet; and feed back a response message according to the request command, where the response message includes a MAC address of a local data processing apparatus and interface addresses, encapsulated according to the Ethernet protocol, of the storage apparatuses managed by the local data processing apparatus; and the interface unit is further configured to receive the response message, and feed back the response message to a storage controller by using the Ethernet switch.

The embodiments of the present invention provide a data processing method, where after being encapsulated according to an Ethernet protocol, a data processing command is sent to a cabinet by using an Ethernet switch, so that a storage controller in a storage engine can communicate with the cabinet by using the Ethernet switch, thereby effectively utilizing advantages such as ease of expansion and simple operation of the Ethernet switch.

BRIEF DESCRIPTION OF DRAWINGS

To describe the technical solutions in the embodiments of the present invention or in the prior art more clearly, the following briefly introduces the accompanying drawings required for describing the embodiments or the prior art.

FIG. 6 is a schematic diagram of a format of an acknowledgement packet to an Ethernet broadcast packet according to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention.

Figure 1:
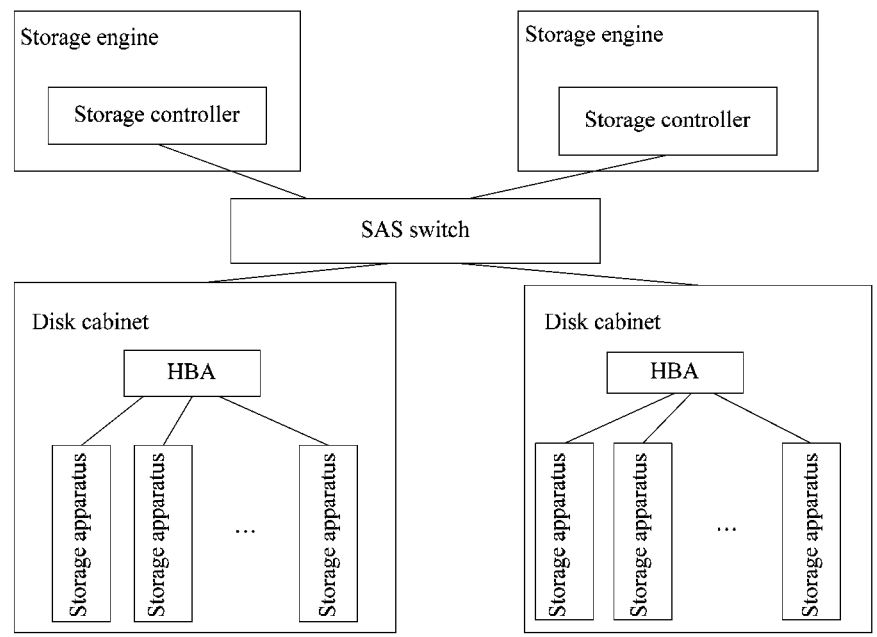
FIG. 1 is a schematic diagram of an architecture of a storage network in the prior art.
Figure 2:
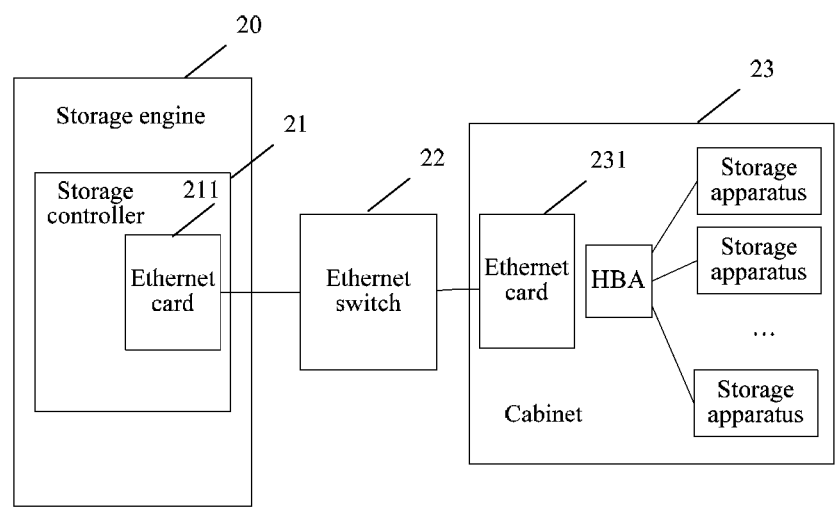
FIG. 2 is a schematic diagram of an architecture of a storage network according to an embodiment of the present invention.

An embodiment of the present invention provides a storage network. As shown in FIG. 2, the storage network includes a storage controller 21, an Ethernet switch 22, and a cabinet 23, where multiple storage apparatuses are disposed in the cabinet 23, the cabinet 23 manages the storage apparatuses disposed therein, and the storage controller 21 and the cabinet 23 are connected to the Ethernet switch 22 separately. The storage controller 21 may be disposed in a storage engine 20. An Ethernet card 211 is disposed in the storage controller 21, and the Ethernet card 211 is connected to the Ethernet switch 22. An Ethernet card 231 is disposed at a front end of the cabinet 23, and the Ethernet card 231 is connected to the Ethernet switch 22. An apparatus for implementing an input/output connection to the multiple storage apparatuses, for example, a host bus adapter (HBA), used to connect the multiple storage apparatuses in the cabinet, is disposed at a back end of the cabinet 23. The storage apparatus may be a storage apparatus having an interface that can receive a SAS protocol data packet, which, for example, may be a solid state disk.

The storage network may further include multiple cabinets whose structures are the same as that of the cabinet 23, where the cabinets are separately connected to the Ethernet switch 22 by using Ethernet cards. The storage controller 21 may access a storage apparatus in any one of the cabinets by using the Ethernet switch 22 according to an actual requirement. The storage network may be a SAN network.

Figure 3:
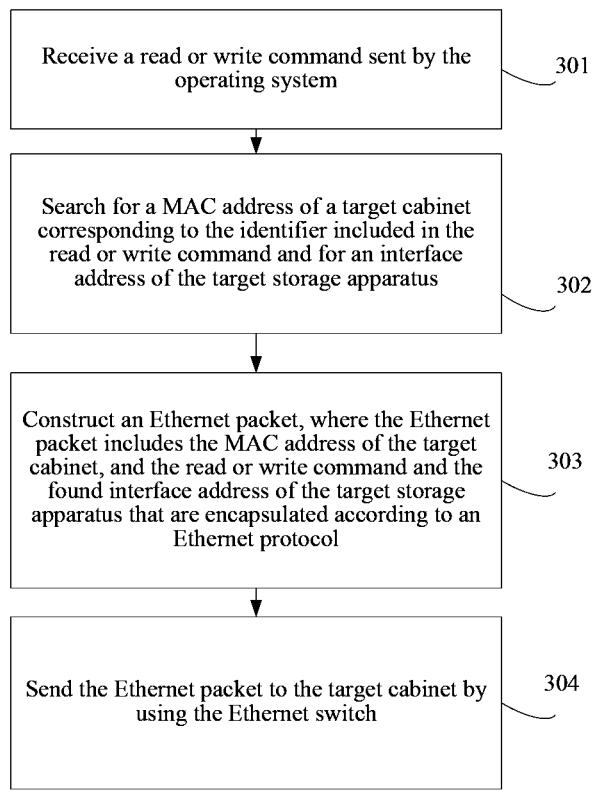
FIG. 3 is a flowchart of a data processing method according to an embodiment of the present invention.

Referring to FIG. 3, an embodiment of the present invention provides a data processing method, applied to a storage network, where the storage network includes a storage engine, an Ethernet switch, and a cabinet, where the storage engine includes a storage controller, an operating system runs in the storage controller, the storage controller and the cabinet are connected to the Ethernet switch separately, multiple storage apparatuses are disposed in the cabinet, the cabinet manages the storage apparatuses disposed therein, the storage controller communicates with the cabinet by using the Ethernet switch, to access a storage apparatus in the cabinet, and the operating system running in the storage controller sends a data processing command to the storage controller. That the command is a read or write command is used as an example in this embodiment of the present invention. The method includes:

Step 301: The storage controller receives a read or write command sent by the operating system, where the command includes an identifier of a target storage apparatus aimed at by the read or write command.

Step 302: The storage controller searches a preset mapping relationship for a media access control (MAC) address of a target cabinet corresponding to the identifier included in the read or write command and for an interface address of the target storage apparatus.

The preset mapping relationship includes a mapping relationship among an interface address of a storage apparatus in the storage network, an identifier of the storage apparatus, and a MAC address of a cabinet to which the storage apparatus belongs. Refer to the following Table 1:

TABLE 1

| Identifier of a storage apparatus | Interface address of the storage apparatus | MAC address of a cabinet in which the storage apparatus is located |
|---|---|---|
| Identifier of a storage apparatus A | Interface address of the storage apparatus A | MAC address of a cabinet in which the storage apparatus A is located |
| Identifier of a storage apparatus B | Interface address of the storage apparatus B | MAC address of a cabinet in which the storage apparatus B is located |

How to describe the identifier of the storage apparatus in a specific implementation may be set according to an actual situation.

Step 303: The storage controller constructs an Ethernet packet, where the Ethernet packet includes the MAC address of the target cabinet, and the read or write command and the found interface address of the target storage apparatus that are encapsulated according to an Ethernet protocol.

Step 304: The storage controller sends the Ethernet packet to the target cabinet by using the Ethernet switch.

Figures 4, 5:
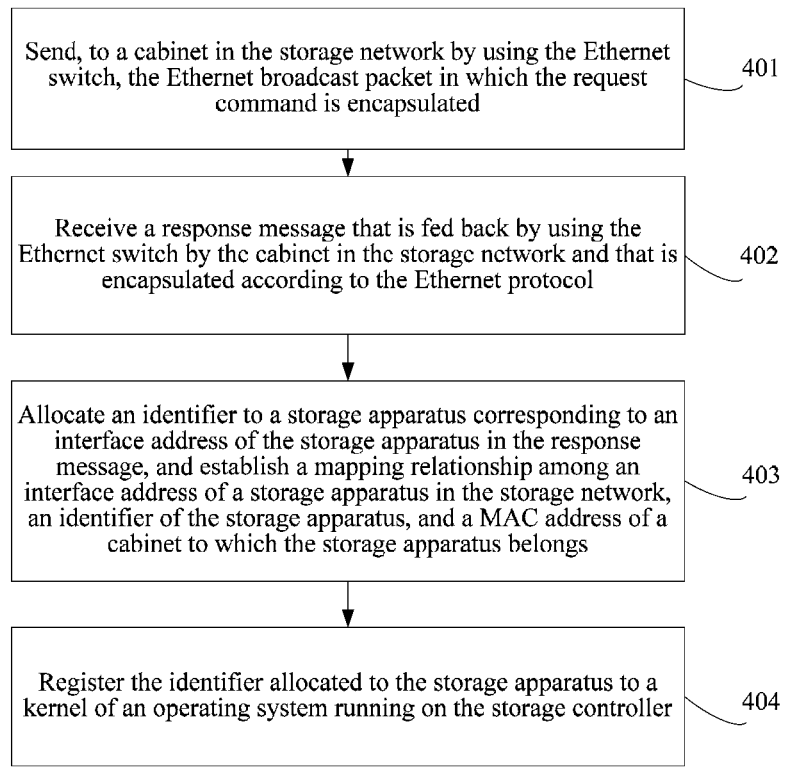
FIG. 4 is a schematic flowchart of setting a mapping relationship according to an embodiment of the present invention.
FIG. 5 is a schematic diagram of a format of an Ethernet broadcast packet according to an embodiment of the present invention.

Referring to FIG. 4, the preset mapping relationship in step 302 may be used to scan, after a cabinet in a storage system starts, processes of a storage apparatus disposed in the cabinet to find a disk, and may be specifically preset by using the following manner.

Step 401: The storage controller encapsulates a request command in an Ethernet broadcast packet according to the Ethernet protocol, and sends, to the cabinet in the storage network by using the Ethernet switch, the Ethernet broadcast packet in which the request command is encapsulated, where the request command is used to request the cabinet to report a MAC address of the local cabinet and information about the managed storage apparatuses.

The storage controller sends a broadcast packet to all cabinets in the storage network, to request each cabinet to report information about a disk managed by the cabinet. In this embodiment of the present invention, the Ethernet broadcast packet sent by the storage controller to all the cabinets is a private broadcast packet. This embodiment of the present invention provides an implementation manner of a format of a private broadcast packet encapsulated according to the Ethernet protocol, as shown in FIG. 5, where "source MAC address" is an address of the storage controller sending the Ethernet broadcast packet, "protocol type" indicates a protocol type of a "payload" field, specific request content is added in the "payload" field, and "request type" is used to indicate a format or a type of request content.

After receiving the Ethernet broadcast packet in which the request command is encapsulated according to the Ethernet protocol, the cabinet in the storage network decapsulates the Ethernet broadcast packet to acquire the request command in the private broadcast packet. The cabinet responds to the Ethernet broadcast packet, and reports, to the storage controller, the information about the managed storage apparatuses, including interface address information of the managed storage apparatuses and the MAC address of the cabinet in which the storage apparatuses are located. After encapsulating to-be-reported information according to the Ethernet protocol, the cabinet feeds back, by using the Ethernet switch to the storage controller sending the Ethernet broadcast packet, an acknowledgement packet in response to the Ethernet broadcast packet. Referring to FIG. 6, this embodiment of the present invention provides an implementation manner of a format of an acknowledgement packet in response to an Ethernet broadcast packet, where a destination MAC address in a MAC header is an address of the storage controller sending the Ethernet broadcast packet, a source MAC address is the MAC address of the cabinet feeding back the acknowledgement packet, and a quantity of storage apparatuses and an interface address of each storage apparatus are carried in a "payload" field.

Therefore, steps for establishing the mapping relationship further include:

Step 402: The storage controller receives a response message that is fed back by using the Ethernet switch by the cabinet in the storage network and that is encapsulated according to the Ethernet protocol, where the response message includes the MAC address of the cabinet feeding back the response message and interface addresses of the managed storage apparatuses.

The interface addresses of the storage apparatuses may be different addresses according to different storage apparatuses in a specific application scenario, which is not limited in this embodiment of the present invention. For example, if a storage apparatus is a SAS interface disk, an interface address of the storage apparatus is a SAS address; if a storage apparatus is a SATA interface disk, an interface address of the storage apparatus is a SATA address.

Step 403: The storage controller allocates identifiers to the storage apparatuses corresponding to the interface addresses of the storage apparatuses in the response message, and establishes a mapping relationship among an interface address of a storage apparatus in the storage network, an identifier of the storage apparatus, and a MAC address of a cabinet to which the storage apparatus belongs.

The storage controller may determine, according to an interface address, whether a type of a storage apparatus is, for example, a SAS disk, or a SATA interface disk, and allocates, according to different disk types, identifiers that can be identified by the operating system to the storage apparatuses. After allocating an identifier to each storage apparatus, the storage controller may register the identifier of each storage apparatus to a kernel of the operating system running in the storage controller, so that when the operating system sends a read/write command to the storage controller subsequently, an identifier of a storage apparatus aimed at by the read/write command is carried. Therefore, the identifiers of the storage apparatuses are identifiers that can be identified by the operating system. For example, when the storage apparatuses are SAS disks, the storage controller may allocate a four-tuple ID to each SAS disk and registers the four-tuple ID of each disk to the kernel of the operating system running in the storage controller sending the private broadcast packet. It should be noted that, in this embodiment of the present invention, an operating system runs in each storage controller; the storage controllers are independent from each other in allocating identifiers to storage apparatuses; and the allocated identifiers are registered to and run in a kernel of the local operating system.

Therefore, after the storage controller allocates an identifier to a found disk, the following may be further included:

Step 404: The storage controller registers the identifiers allocated to the storage apparatuses to a kernel of the operating system running in the storage controller, where the identifiers of the storage apparatuses are identifiers that can be identified by the operating system.

This embodiment of the present invention provides a data processing method, where after being encapsulated according to an Ethernet protocol, a read or write command is sent to a cabinet by using an Ethernet switch, so that a storage controller in a storage engine can communicate with the cabinet by using the Ethernet switch, thereby effectively utilizing advantages such as ease of expansion and simple operation of the Ethernet switch.

Figure 7:
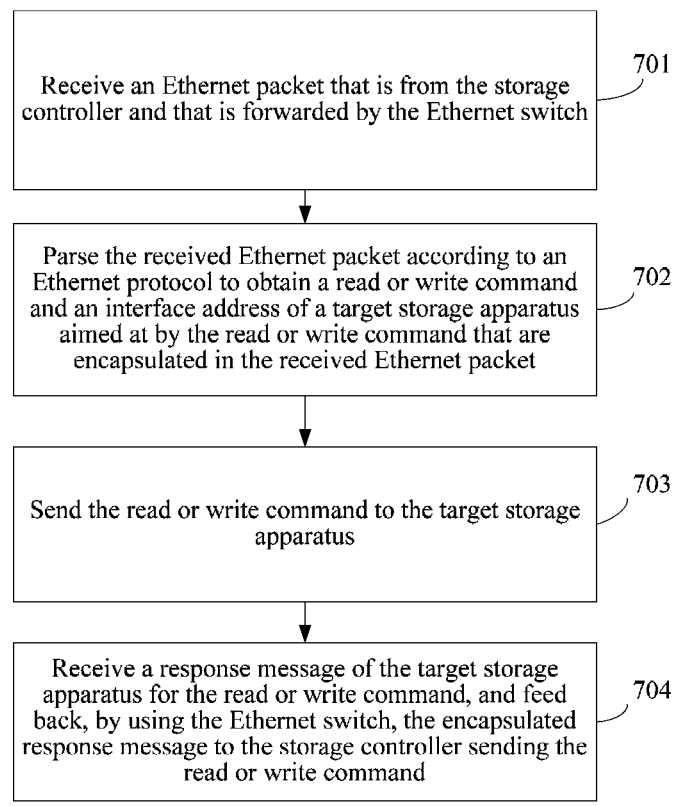
FIG. 7 is a schematic flowchart of another data processing method according to an embodiment of the present invention.

Referring to FIG. 7, an embodiment of the present invention further provides a data processing method, applied to a storage network, where the storage network includes a storage engine, an Ethernet switch, and a cabinet, where the storage engine includes a storage controller, an operating system runs in the storage controller, the storage controller and the cabinet are connected to the Ethernet switch separately, multiple storage apparatuses are disposed in the cabinet, the cabinet manages the storage apparatuses disposed therein, and the storage controller accesses a storage apparatus in the cabinet by using the Ethernet switch; and the method includes:

Step 701: The cabinet receives an Ethernet packet that is from the storage controller and that is forwarded by the Ethernet switch, where the Ethernet packet includes a read or write command sent by the storage controller and an interface address of a target storage apparatus aimed at by the read or write command.

In this embodiment of the present invention, the cabinet receives the Ethernet packet forwarded by the Ethernet switch. After receiving the Ethernet packet sent by the storage controller, the Ethernet switch forwards, according to a MAC address of a cabinet carried in the Ethernet packet sent by the storage controller, the received Ethernet packet to the cabinet corresponding to the MAC address of the cabinet.

Step 702: The cabinet parses the received Ethernet packet according to an Ethernet protocol to obtain the read or write command and the interface address of the target storage apparatus aimed at by the read or write command that are encapsulated in the received Ethernet packet.

Step 703: The cabinet sends the read or write command to the target storage apparatus according to the interface address of the target storage apparatus.

In a specific implementation, the read or write command is sent to an interface of the target storage apparatus.

After carrying out an instruction in the read or write command, the target storage apparatus sends a response message to the cabinet, and the cabinet feeds back the response message to the storage controller sending the read or write command. Therefore, this embodiment of the present invention may further include:

Step 704: The cabinet receives a response message of the target storage apparatus for the read or write command, encapsulates the response message according to the Ethernet protocol, and then feeds back, by using the Ethernet switch, the encapsulated response message to the storage controller sending the read or write command.

Generally, a tag value is carried in a command sent by a storage controller. The target storage apparatus may feed back the response message to a storage controller according to the tag value in the command.

In a process of finding a disk, the storage controller sends a private broadcast packet to the cabinet to request the cabinet to report information about the storage apparatuses managed by the cabinet. Therefore, before the step 701, this embodiment of the present invention may further include:

Step 705: The cabinet receives an Ethernet broadcast packet sent by the storage controller, where a request command is encapsulated in the Ethernet broadcast packet according to the Ethernet protocol, and the request command is used to request the cabinet to report a MAC address of the local cabinet and information about the managed storage apparatuses.

Step 706: The cabinet feeds back, by using the Ethernet switch, a response message to the storage controller sending the Ethernet broadcast packet, where the response message includes the MAC address of the local cabinet and interface addresses, encapsulated according to the Ethernet protocol, of the storage apparatuses managed by the local cabinet.

According to the data processing method provided in this embodiment of the present invention, a cabinet can parse an Ethernet packet to obtain a read or write command and a storage apparatus aimed at by the read or write command, so that a storage controller in a storage engine can communicate with the cabinet by using an Ethernet switch, thereby effectively utilizing advantages such as ease of expansion and simple operation of the Ethernet switch.

Figure 8:
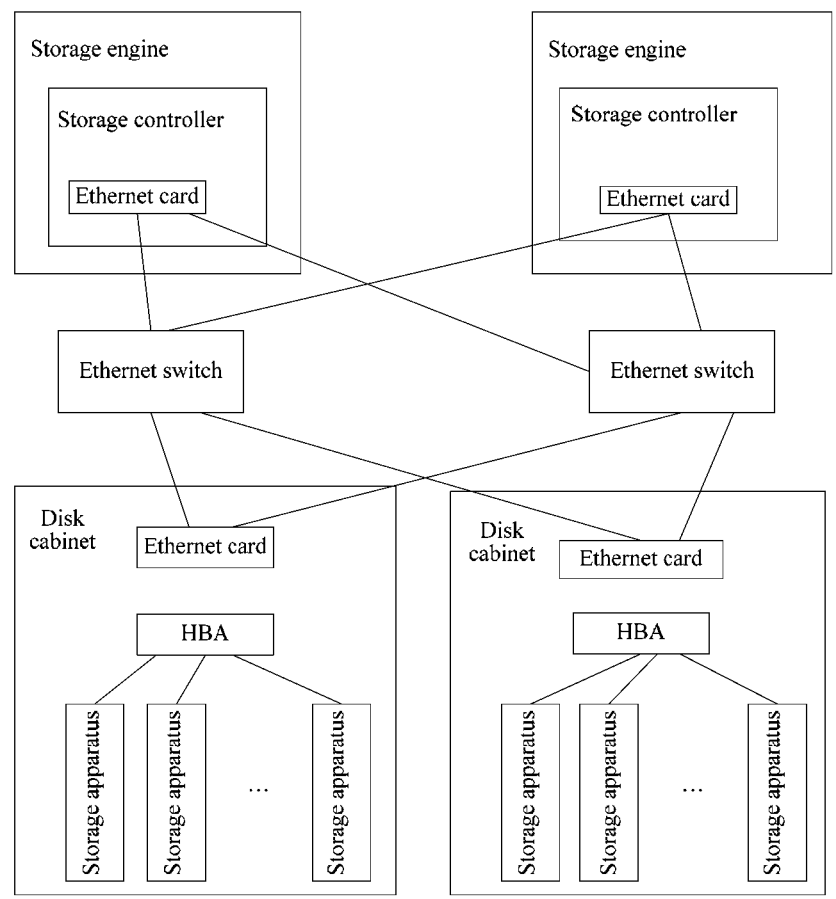
FIG. 8 is a diagram of an application scenario of a data processing method according to an embodiment of the present invention.
Figure 9:
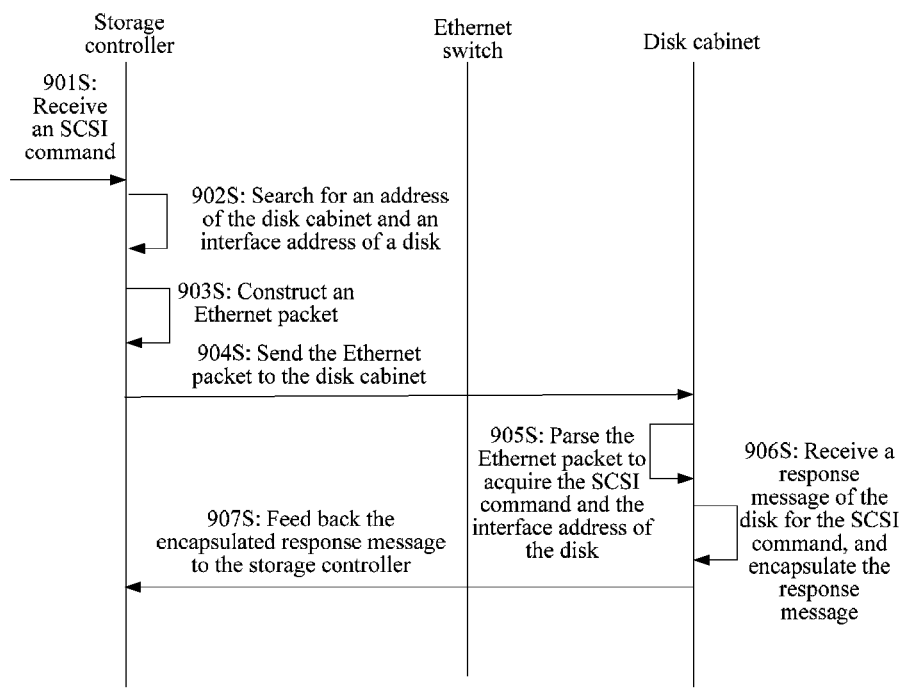
FIG. 9 is a schematic flowchart of a data processing method according to an embodiment of the present invention.

Referring to FIG. 8, a data processing method provided in an embodiment of the present invention is described by using an example with reference to a specific application scenario. This embodiment of the present invention is applied to a storage area network SAN, where the network includes multiple storage engines, each storage engine includes a storage controller, an Ethernet switch, and multiple disk cabinets, where an operating system runs in the storage controller, the storage controller in each storage engine is separately connected to the Ethernet switch, multiple disks having SAS interfaces are disposed in each disk cabinet, each disk cabinet manages locally disposed SAS disks, and the storage controller accesses a SAS disk in a disk cabinet by using the Ethernet switch. Referring to FIG. 9, a data processing procedure includes:

Step 901S: The storage controller receives a Small Computer System Interface (SCSI) read or write command sent by the operating system, where the command includes a four-tuple ID of a target disk aimed at by the SCSI read or write command.

In this embodiment, a four-tuple ID of a disk is used as an identifier for distinguishing the disk.

Step 902S: The storage controller searches a preset mapping relationship for a MAC address of a target disk cabinet corresponding to the four-tuple ID included in the SCSI read or write command and for a SAS interface address of the target disk.

The preset mapping relationship includes a mapping relationship among an interface address of a disk in the storage network, a four-tuple ID of the disk, and a MAC address of a disk cabinet in which the disk is located. Refer to the following Table 2:

TABLE 2

| Four-tuple ID of a disk | SAS interface address of the disk | MAC address of a disk cabinet in which the disk is located |
| --- | --- | --- |
| Four-tuple ID of a disk A | SAS interface address of the disk A | MAC address of a disk cabinet in which the disk A is located |
| Four-tuple ID of a disk B | SAS interface address of the disk B | MAC address of a disk cabinet in which the disk B is located |
| . . . | . . . | . . . |
| Four-tuple ID of a disk n | SAS interface address of the disk n | MAC address of a disk cabinet in which the disk n is located |

In this embodiment of the present invention, a four-tuple ID of a SAS disk is used as an identifier of the SAS disk, and the storage controller registers a four-tuple ID of a found disk to a kernel of the operating system running in the storage controller.

Step 903S: The storage controller constructs an Ethernet packet, where the Ethernet packet includes the MAC address of the target disk cabinet, and the SCSI read or write command encapsulated according to an Ethernet protocol.

Step 904S: Send the Ethernet packet to the Ethernet switch, and send the Ethernet packet to the target disk cabinet by using the Ethernet switch.

Step 905S: The disk cabinet receives the Ethernet packet forwarded by the Ethernet switch, where the Ethernet packet includes the SCSI read or write command sent by the storage controller and the SAS interface address of the target disk aimed at by the SCSI read or write command; and the disk cabinet parses the received Ethernet packet according to the Ethernet protocol to obtain the SCSI read or write command and the interface address of the target disk aimed at by the read or write command that are encapsulated in the received Ethernet packet.

Step 906S: The disk cabinet receives a response message of the target disk for the SCSI read or write command and encapsulates the response message according to the Ethernet protocol.

Step 907S: The disk cabinet feeds back, by using the Ethernet switch, the encapsulated response message to the storage controller sending the SCSI read or write command.

According to the data processing method provided in this embodiment of the present invention, a storage controller can communicate with a disk cabinet by constructing an Ethernet packet, thereby effectively utilizing advantages such as ease of expansion and simple operation of an Ethernet switch.

Figure 10:
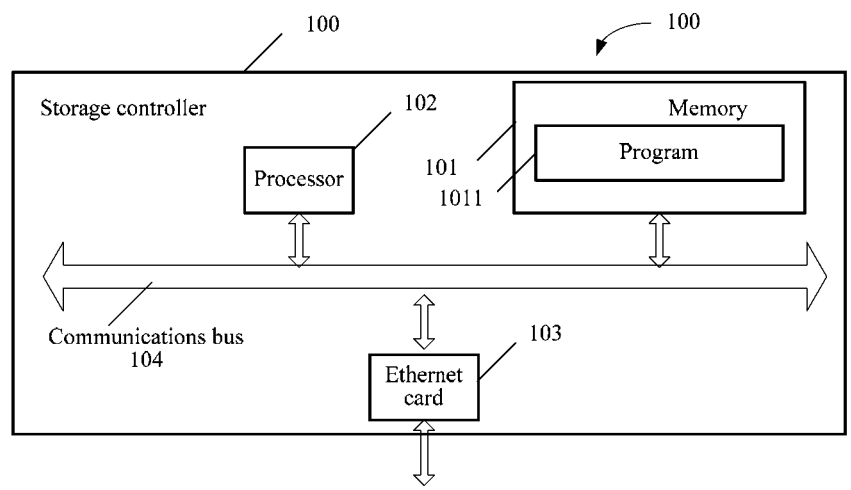
FIG. 10 is a schematic structural diagram of a storage controller according to an embodiment of the present invention.

Referring to FIG. 10, an embodiment of the present invention further provides a storage controller 100, where the storage controller provided in this embodiment of the present invention is configured to implement the method implemented by the storage controller in the method embodiments. An implementation principle and a technical effect thereof are similar. The storage controller provided in this embodiment of the present invention is applied to a storage network, where the storage network includes the storage controller, an Ethernet switch, and a cabinet, where an operating system runs in the storage controller, the storage controller and the cabinet are connected to the Ethernet switch separately, the storage controller communicates with the cabinet by using the Ethernet switch, multiple storage apparatuses are disposed in the cabinet, and the cabinet manages the storage apparatuses disposed therein. The storage controller 100 includes a memory 101, a processor 102, an Ethernet card 103, and a communications bus 104, where the memory 101, the processor 102, and the Ethernet card 103 communicate with each other by using the bus, and the processor 102 receives an Ethernet packet by using the Ethernet card 103.

The memory 101 is configured to store a computer program instruction 1011.

The processor 102 is configured to execute the following according to the computer program instruction: receiving a data processing command sent by the operating system, where the command includes an identifier of a target storage apparatus aimed at by the data processing command; searching a preset mapping relationship for a media access control MAC address of a target cabinet corresponding to the identifier included in the data processing command and for an interface address of the target storage apparatus; constructing an Ethernet packet, where the Ethernet packet includes the MAC address of the target cabinet, and the data processing command and the found interface address of the target storage apparatus that are encapsulated according to an Ethernet protocol; and sending the Ethernet packet to the Ethernet card 103.

The Ethernet card 103 is configured to send the Ethernet packet to the target cabinet by using the Ethernet switch.

Before executing the step of receiving a data processing command sent by the operating system, the processor 102 is further configured to: encapsulate a request command in an Ethernet broadcast packet according to the Ethernet protocol, and send, to the Ethernet card 103, the Ethernet broadcast packet in which the broadcast packet is encapsulated.

The request command is used to request the cabinet to report a MAC address of the local cabinet and information about the managed storage apparatuses.

The Ethernet card 103 is further configured to send the Ethernet broadcast packet to the cabinet in the storage network by using the Ethernet switch.

The Ethernet card 103 is further configured to receive a response message fed back by using the Ethernet switch by the cabinet in the storage network, where the response message includes the MAC address of the cabinet and interface addresses, encapsulated according to the Ethernet protocol, of the managed storage apparatuses.

The processor 102 is further configured to: allocate identifiers to the storage apparatuses corresponding to the interface addresses of the storage apparatuses in the response message, and establish a mapping relationship among an interface address of a storage apparatus in the storage network, an identifier of the storage apparatus, and a MAC address of a cabinet to which the storage apparatus belongs.

The identifier of the storage apparatus is an identifier that can be identified by the operating system.

The processor 102 is further configured to: after allocating the identifiers to the storage apparatuses, register the identifiers allocated to the storage apparatuses to a kernel of the operating system running in the storage controller.

This embodiment of the present invention provides a storage controller, where after being encapsulated according to an Ethernet protocol, a read or write command is sent to a cabinet by using an Ethernet switch, so that a storage controller in a storage engine can communicate with the cabinet by using the Ethernet switch, thereby effectively utilizing advantages such as ease of expansion and simple operation of the Ethernet switch.

Figure 11:
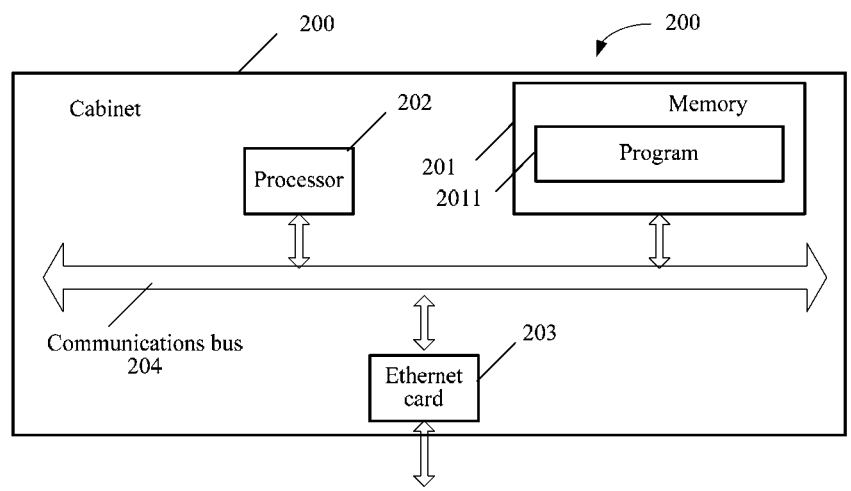
FIG. 11 is a schematic structural diagram of a cabinet according to an embodiment of the present invention.

Referring to FIG. 11, an embodiment of the present invention further provides a cabinet 200, applied to a storage network, where the storage network includes a storage controller, an Ethernet switch, and the cabinet, where an operating system runs in the storage controller, the storage controller and the cabinet are connected to the Ethernet switch separately, the storage controller communicates with the cabinet by using the Ethernet switch, multiple storage apparatuses are disposed in the cabinet, and the cabinet manages the storage apparatuses disposed therein. The cabinet 200 includes a memory 201, a processor 202, an Ethernet card 203, and a communications bus 204, where the memory 201, the processor 202, and the Ethernet card 203 communicate with each other by using the bus, and the processor 202 receives an Ethernet packet by using the Ethernet card 203.

The Ethernet card 203 is configured to receive an Ethernet packet that is from the storage controller and that is forwarded by the Ethernet switch, where the Ethernet packet includes a data processing command and an interface address of a target storage apparatus aimed at by the data processing command that are encapsulated according to an Ethernet protocol.

The memory 201 is configured to store a computer program instruction 2011.

The processor 202 is configured to: parse the received Ethernet packet according to the Ethernet protocol to obtain the data processing command and the interface address of the target storage apparatus aimed at by the data processing command that are encapsulated in the received Ethernet packet; and send the data processing command to the target storage apparatus according to the interface address of the target storage apparatus.

The Ethernet card 203 is further configured to receive an Ethernet broadcast packet sent by using the Ethernet switch by the storage controller, where the Ethernet broadcast packet includes a request command encapsulated according to the Ethernet protocol, and the request command is used to request the cabinet to report a MAC address of the local cabinet and information about the managed storage apparatuses.

The processor 202 is further configured to: parse the Ethernet broadcast packet; and feed back a response message according to the request command, where the response message includes the MAC address of the local cabinet and interface addresses, encapsulated according to the Ethernet protocol, of the storage apparatuses managed by the local cabinet.

The Ethernet card 203 is further configured to receive the response message, and feed back the response message to the storage controller by using the Ethernet switch.

The cabinet provided in this embodiment of the present invention can parse an Ethernet packet to obtain a read or write command and a storage apparatus aimed at by the read or write command, so that a storage controller in a storage engine can communicate with the cabinet by using an Ethernet switch, thereby effectively utilizing advantages such as ease of expansion and simple operation of the Ethernet switch.

Figure 12:
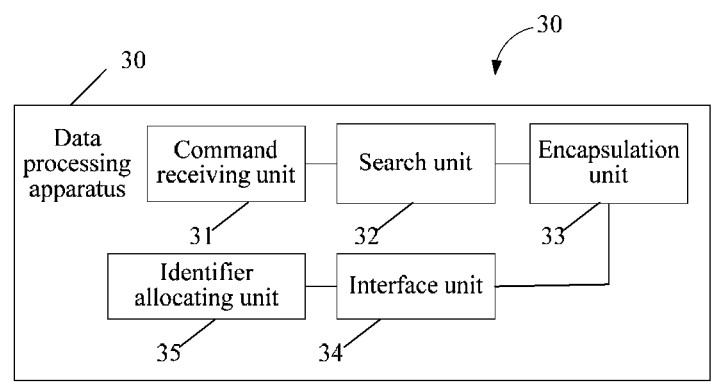
FIG. 12 is a schematic structural diagram of a data processing apparatus according to an embodiment of the present invention.

Referring to FIG. 12, an embodiment of the present invention further provides a data processing apparatus 30, configured to implement the method corresponding to FIG. 3. An implementation principle and an effect thereof are similar to those of the method. An operating system runs in the data processing apparatus, and the data processing apparatus 30 includes:

a command receiving unit 31, configured to receive a data processing command sent by the operating system, where the command includes an identifier of a target storage apparatus aimed at by the data processing command;

a search unit 32, configured to search a preset mapping relationship for a media access control (MAC) address of a target cabinet corresponding to the identifier included in the data processing command and for an interface address of the target storage apparatus, where the target cabinet manages the target storage apparatus;

an encapsulation unit 33, configured to construct an Ethernet packet, where the Ethernet packet includes the MAC address of the target cabinet, and the data processing command and the found interface address of the target storage apparatus that are encapsulated according to an Ethernet protocol; and an interface unit 34, configured to send the Ethernet packet to the target cabinet by using an Ethernet switch.

Before the command receiving unit 31 receives a read or write command sent by the operating system, the encapsulation unit 33 is further configured to encapsulate a request command in an Ethernet broadcast packet according to the Ethernet protocol.

The request command is used to request a cabinet in a storage network to report a MAC address of the local cabinet and information about a managed storage apparatus.

The interface unit 34 is further configured to: send, to the cabinet in the storage network by using the Ethernet switch, the Ethernet broadcast packet in which the request command is encapsulated; and receive a response message fed back by using the Ethernet switch by the cabinet, where the response message includes the MAC address of the cabinet and an interface address, encapsulated according to the Ethernet protocol, of the managed storage apparatus.

The data processing apparatus 30 further includes: an identifier allocation unit 35, configured to: allocate an identifier to the storage apparatus corresponding to the interface address of the storage apparatus in the response message, and establish a mapping relationship among an interface address of a storage apparatus in the storage network, an identifier of the storage apparatus, and a MAC address of a cabinet to which the storage apparatus belongs.

The identifier of the storage apparatus is an identifier that can be identified by the operating system.

In a specific implementation, the identifier allocation unit 35 allocates the identifier to the storage apparatus corresponding to the interface address of the storage apparatus in the response message obtained by parsing an Ethernet packet of the response message.

After allocating the identifier to the storage apparatus corresponding to the interface address of the storage apparatus in the response message, the identifier allocation unit 35 is further configured to register the identifier allocated to the storage apparatus to a kernel of the operating system running in the data processing apparatus.

Figure 13:
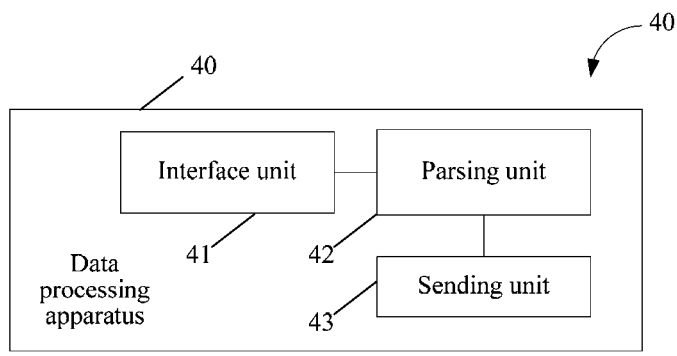
FIG. 13 is a schematic structural diagram of a data processing apparatus according to an embodiment of the present invention.

Referring to FIG. 13, an embodiment of the present invention further provides a data processing apparatus 40, where multiple storage apparatuses are disposed in the data processing apparatus, the data processing apparatus manages the storage apparatuses disposed therein, and the data processing apparatus 40 includes:

an interface unit 41, configured to receive an Ethernet packet, where the Ethernet packet includes a data processing command and an interface address of a target storage apparatus aimed at by the data processing command that are encapsulated according to an Ethernet protocol;

a parsing unit 42, configured to parse the received Ethernet packet according to the Ethernet protocol to obtain the data processing command and the interface address of the target storage apparatus aimed at by the data processing command that are encapsulated in the received Ethernet packet according to the Ethernet protocol; and a sending unit 43, configured to: send the data processing command to the target storage apparatus according to the interface address of the target storage apparatus.

The interface unit 41 is further configured to receive an Ethernet broadcast packet sent by using an Ethernet switch, where the Ethernet broadcast packet includes a request command encapsulated according to the Ethernet protocol, and the request command is used to request the data processing apparatus to report a MAC address of the local data processing apparatus and information about the managed storage apparatuses.

The parsing unit 42 is further configured to: parse the Ethernet broadcast packet; and feed back a response message according to the request command, where the response message includes a MAC address of a local data processing apparatus and interface addresses, encapsulated according to the Ethernet protocol, of the storage apparatuses managed by the local data processing apparatus.

The interface unit 41 is further configured to receive the response message, and feed back the response message to a storage controller by using the Ethernet switch.

The data processing apparatus that is corresponding to FIG. 13 and that is provided in this embodiment of the present invention can parse an Ethernet packet to obtain a data processing command and a storage apparatus aimed at by the data processing command, so that a storage controller in a storage engine can communicate with the data processing apparatus by using an Ethernet switch, thereby effectively utilizing advantages such as ease of expansion and simple operation of the Ethernet switch.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention.

What is claimed is:

1. A data processing method implemented in a storage network including a storage controller, an Ethernet switch, and a cabinet, wherein the storage controller is configured to run an operating system and communicate with the cabinet by using the Ethernet switch, and the cabinet is configured to manage a plurality of storage apparatuses disposed therein, and the method comprises:

receiving, by the storage controller, a data processing command sent by the operating system, wherein the data processing command comprises an identifier of a target storage apparatus disposed in the cabinet by the data processing command;

searching, by the storage controller, a preset mapping relationship for a media access control (MAC) address of the cabinet corresponding to the identifier comprised in the data processing command and for an interface address of the target storage apparatus;

constructing, by the storage controller, an Ethernet packet, wherein the Ethernet packet comprises the MAC address of the cabinet, and the data processing command and the interface address of the target storage apparatus that are encapsulated according to an Ethernet protocol, and sending the Ethernet packet to the cabinet using the Ethernet switch;

encapsulating, by the storage controller, a request command in an Ethernet broadcast packet according to the Ethernet protocol, and sending, to the cabinet in the storage network using the Ethernet switch, the Ethernet broadcast packet in which the request command is encapsulated, wherein the request command is used to request the cabinet to report the MAC address of the cabinet and information about the managed storage apparatuses;

receiving, by the storage controller, a response message fed back by using the Ethernet switch by the cabinet, wherein the response message comprises the MAC address of the cabinet and the interface address, encapsulated according to the Ethernet protocol, of the target storage apparatus; and allocating, by the storage controller, the identifier to the target storage apparatus corresponding to the interface address of the storage apparatus in the response message, and establishing a mapping relationship among the interface address of the target storage apparatus, the identifier of the target storage apparatus, and the MAC address of the cabinet in which the target storage apparatus disposed, wherein the identifier of the target storage apparatus is an identifier that is identified by the operating system.

2. The data processing method according to claim 1, the method further comprising:

registering, by the storage controller, the identifier allocated to the target storage apparatus to a kernel of the operating system running in the storage controller.

3. The data processing method according to claim 1, wherein the storage network is a storage area network, the target storage apparatus is a serial attached small computer system (SAS) interface disk, and the identifier of the target storage apparatus is a four-tuple ID of the SAS disk.

4. A data processing method implemented in a storage network including a storage controller, an Ethernet switch, and a cabinet, wherein the storage controller is configured to run an operating system and communicate with the cabinet by using the Ethernet switch, and the cabinet is configured to manage a plurality of storage apparatuses disposed therein; and the method comprises:

receiving, by the cabinet, an Ethernet packet that is from the storage controller via the Ethernet switch, wherein the Ethernet packet is encapsulated according to an Ethernet protocol and comprises a data processing command and an interface address of a target storage apparatus disposed in the cabinet aimed at by the data processing command;

parsing, by the cabinet, the received Ethernet packet according to the Ethernet protocol to obtain the data processing command and the interface address of the target storage apparatus;

sending, by the cabinet, the data processing command to the target storage apparatus according to the interface address of the target storage apparatus;

encapsulating, by the storage controller, a request command in an Ethernet broadcast packet according to the Ethernet protocol, and sending, to the cabinet in the storage network using the Ethernet switch, the Ethernet broadcast packet in which the request command is encapsulated, wherein the request command is used to request the cabinet to report a MAC address of the cabinet and information about the managed storage apparatuses;

receiving, by the storage controller, a response message fed back by using the Ethernet switch by the cabinet, wherein the response message comprises the MAC address of the cabinet and the interface address, encapsulated according to the Ethernet protocol, of the target storage apparatus; and allocating, by the storage controller, the identifier to the target storage apparatus corresponding to the interface address of the storage apparatus in the response message, and establishing a mapping relationship among the interface address of the target storage apparatus, the identifier of the target storage apparatus, and the MAC address of the cabinet in which the target storage apparatus disposed, wherein the identifier of the target storage apparatus is an identifier that is identified by the operating system.

5. The data processing method according to claim 4, the method further comprising:

receiving, by the cabinet, an Ethernet broadcast packet sent by the storage controller via the Ethernet switch, wherein the Ethernet broadcast packet comprises a request command encapsulated according to the Ethernet protocol, and the request command is used to request the cabinet to report a MAC address of the cabinet and information about the managed storage apparatuses; and feeding back, by the cabinet by using the Ethernet switch, a response message to the storage controller, wherein the response message comprises the MAC address of the cabinet and the interface address, encapsulated according to the Ethernet protocol, of the target storage apparatus managed by the cabinet.

6. A storage controller implemented in a storage network, comprising:

the storage controller, an Ethernet switch, and a cabinet, wherein the storage controller is configured to run an operating system and communicate with the cabinet by using the Ethernet switch, and the cabinet is configured to manage a plurality of storage apparatuses disposed therein, and the storage controller comprises a processor, an Ethernet card, and a communications bus, wherein the processor and the Ethernet card communicate with each other by using the communication bus;

wherein the processor further comprises computing hardware and a non-transitory computer-readable storage medium including computer-executable instructions executed by the computing hardware to perform on the processor the steps comprising:

receiving a data processing command sent by the operating system, wherein the data processing command comprises an identifier of a target storage apparatus disposed in the cabinet aimed at by the data processing command;

searching a preset mapping relationship for a media access control (MAC) address of the cabinet corresponding to the identifier comprised in the data processing command and for an interface address of the target storage apparatus; and wherein the Ethernet card is configured to construct an Ethernet packet and send the Ethernet packet to the cabinet via the Ethernet switch, wherein the Ethernet packet comprises the MAC address of the target cabinet, and the data processing command and the interface address of the target storage apparatus;

wherein the Ethernet card is further configured to encapsulate a request command in an Ethernet broadcast packet according to the Ethernet protocol, and send the Ethernet broadcast packet in which the request command is encapsulated to the cabinet in the storage network via the Ethernet switch, wherein the request command is used to request the cabinet to report a MAC address of the cabinet and information about the managed storage apparatuses;

the method performed on the processor by the computing hardware according to the computer-executable instructions executed by the computing hardware further comprising:

receiving from the Ethernet card a response message fed back via the Ethernet switch by the cabinet in the storage network, wherein the response message comprises the MAC address of the cabinet and the interface address, encapsulated according to the Ethernet protocol, of the target storage apparatus;

allocating the identifier to the target storage apparatus corresponding to the interface address of the target storage apparatus in the response message; and establishing a mapping relationship among the interface address of the target storage apparatus, the identifier of the target storage apparatus, and the MAC address of the cabinet, wherein the identifier of the target storage apparatus is an identifier that is identified by the operating system.

7. The storage controller according to the claim 6, wherein the method performed on the processor by the computing hardware according to the computer-executable instructions executed by the computing hardware further comprises registering the identifier allocated to the target storage apparatus to a kernel of the operating system running in the storage controller.

8. A cabinet implemented in a storage network including a storage controller, an Ethernet switch, and the cabinet, wherein the storage controller is configured to run an operating system and communicate with the cabinet by using the Ethernet switch and the cabinet is configured to manage a plurality of storage apparatuses disposed therein, and the cabinet comprises a processor, an Ethernet card, and a communications bus, wherein the processor and the Ethernet card communicate with each other by using the communications bus wherein the Ethernet card is configured to receive and parse an Ethernet packet that is sent from the storage controller via the Ethernet switch, wherein the Ethernet packet comprises a data processing command and an interface address of a target storage apparatus aimed at by the data processing command that are encapsulated according to an Ethernet protocol, the processor comprises computing hardware and a non-transitory computer-readable storage medium including computer-executable instructions executed by the computing hardware to perform on the processor the steps comprising:

obtaining the data processing command and the interface address of the target storage apparatus according to the parsing operation by the Ethernet card;

sending the data processing command to the target storage apparatus according to the interface address of the target storage apparatus;

the Ethernet card further configured to receive and parse an Ethernet broadcast packet sent by the storage controller via the Ethernet switch, wherein the Ethernet broadcast packet comprises a request command encapsulated according to the Ethernet protocol, and the request command is used to request the cabinet to report the MAC address of the cabinet and information about the managed storage apparatuses;

the method performed on the processor by the computing hardware according to the computer-executable instructions executed by the computing hardware further comprises: sending a response message to the Ethernet card according to the request command, wherein the response message comprising the interface address of the target storage apparatus; is encapsulated according to the Ethernet protocol and comprises the MAC address of the cabinet and interface addresses of the storage apparatuses managed by the cabinet;

the Ethernet card further configured to receive the response message, encapsulate the response message with the MAC address of the cabinet into an Ethernet broadcast packet response according to the Ethernet protocol, and feed back the Ethernet broadcast packet response to the storage controller via the Ethernet switch.

* * * * *